US008624900B2

(12) United States Patent
Jones et al.

(10) Patent No.: US 8,624,900 B2
(45) Date of Patent: Jan. 7, 2014

(54) PLUG-IN ARCHITECTURE FOR DYNAMIC FONT RENDERING ENABLEMENT

(75) Inventors: Peter Jones, Arlington, MA (US); Maureen Emily Duffy, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 886 days.

(21) Appl. No.: 12/757,118

(22) Filed: Apr. 9, 2010

(65) Prior Publication Data

US 2011/0249013 A1 Oct. 13, 2011

(51) Int. Cl.
*G06T 11/00* (2006.01)

(52) U.S. Cl.
USPC .......... 345/471

(58) Field of Classification Search
None
See application file for complete search history.

(56) References Cited

U.S. PATENT DOCUMENTS

| | | | | |
|---|---|---|---|---|
| 5,579,416 | A * | 11/1996 | Shibuya et al. | 382/293 |
| 5,619,633 | A * | 4/1997 | Turner | 345/441 |
| 6,504,545 | B1 * | 1/2003 | Browne et al. | 345/473 |
| 7,453,464 | B1 * | 11/2008 | Acquavella | 345/474 |
| 7,624,277 | B1 * | 11/2009 | Simard et al. | 713/182 |
| 2004/0196288 | A1 * | 10/2004 | Han | 345/467 |

OTHER PUBLICATIONS

Sue Chastain, "How to Fill Text with an Image in Photoshop without Rendering the Text," Graphics Software, Sep. 2005, Accessed Jun. 25, 2013, http://wayback.archive.org/web/20050925160845/http://graphicssoft.about.com/cs/photoshop/ht/apspatterntext.htm.*

Bah, Tavmjong, "Introduction: Vector Graphics", *Inkscape: Guide to a Vector Drawing Program*, Retrieved via Internet: <http://tavmjong.free.fr/INKSCAPE/MANUAL/html/Introduction-VectorGraphics.html> on Apr. 14, 2010, (2005), 2 pages.

The GIMP Documentation Team, "Introduction: Welcome to GIMP", *GNU Image Manipulation Program User Manual*, Retrieved via Internet: <http://docs.gimp.org/2.6/en/introduction.html> on Apr. 14, 2010, (2002), 2 pages.

Knuth, Donald E., "A Punk Meta-Font", TUGboat, vol. 9, No. 2, (1988), pp. 152-168.

* cited by examiner

*Primary Examiner* — Aaron M Richer
*Assistant Examiner* — Nicholas R Wilson
(74) *Attorney, Agent, or Firm* — Lowenstein Sandler LLP

(57) ABSTRACT

A computer system provides a plug-in architecture for creation of a dynamic font. The computer system can incorporate a new filter function into a filtering layer of a font program. The filtering layer includes pre-defined filter functions to transform a base font into a new font. The computer system applies one or more font rules in the filtering layer to the base font. The font rules are implemented by the new filter function and at least one of the pre-defined filter functions to randomize an appearance of each character in a character string. The character string rendered with the new font has a dynamic and randomized appearance.

20 Claims, 5 Drawing Sheets

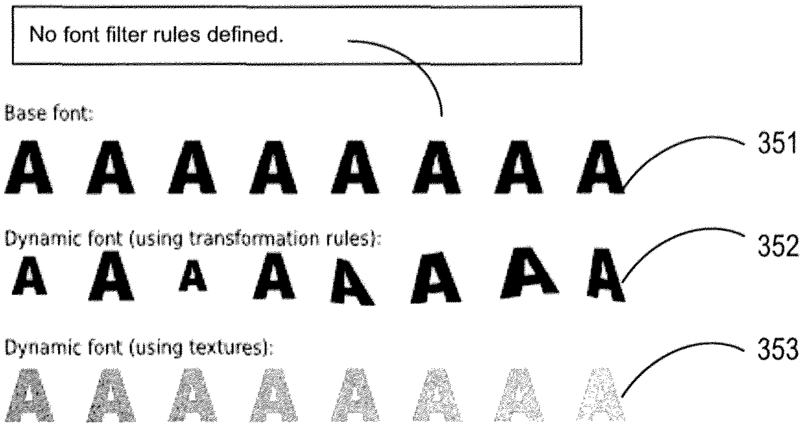

310

```
SKIPFACTOR = 4
n = 1
string = 'A A A A A A A A A A A A A A A A'
while (there are letters left to render in string)
{
m = SKIPFACTOR*n
for (string[m]; m > SKIPFACTOR*n - SKIPFACTOR)
{
Scale type randomly between
75% and 100% for letter string[m]
m--
}
p = SKIPFACTOR*n+SKIPFACTOR
for (string[p]; p > SKIPFACTOR*n)
Distort type randomly between
10% distortion and 50% distortion for
letter string[p]
p--
}
n++
}
```

316

317

320

```
n = 1
t = 0
string = 'A A A A A A A A A A A A A A A A'
texture = sometexture.svg
while (there are letters left to render in string)
{
while (t < 100)
{
apply texture to letter at t%
strength
t = t + 10
}
n++
}
```

FIG. 3

PLUG-IN ARCHITECTURE FOR DYNAMIC FONT RENDERING ENABLEMENT

TECHNICAL FIELD

Embodiments of the present invention relate to font creation, and more specifically, to the generation and rendering of a dynamic font.

BACKGROUND

Typography is the technique of designing and arranging type. The design and arrangement of type involves the selection of typefaces, point size, line length, leading (line spacing), adjusting the spaces between groups of letters (tracking) and adjusting the space between pairs of letters (kerning). Examples of a typeface include "Liberation Sans," "Times New Roman," "Arial," etc. A font has a specific size designation. For example, "Liberation Sans 10 point" is a font. A font author, designer or creator is a person that writes the software driving the usage of the typeface For artistic effect, font authors may sometimes create fonts with distressed, rough, or otherwise organic effects. Typically, these effects are statically embedded in the fonts. If an end user uses the same character in a sequence, these effects are conspicuously repeated and the illusion of organic effect to the font is broken.

To obtain a more dynamic or organic-looking type treatment, a font user often converts a font to vector or bitmap artwork and manually applies the dynamic or organic effects to the type. The process is manual and time-intensive. Further, manipulation of vector or bitmap artwork necessitates the work of a skilled artist, which means automation of the effects would be extremely difficult. Additionally, an end user, who simply wishes to consume a font without an intimate knowledge of font creation, would be unable to use a font that requires manipulation of vector artwork.

BRIEF DESCRIPTION OF THE DRAWINGS

The present invention is illustrated by way of example, and not by way of limitation, and can be more fully understood with reference to the following detailed description when considered in connection with the figures in which:

FIG. 3 illustrates an example of font rules applied to a string of identical letters in a base font.

DETAILED DESCRIPTION

Figure 1:
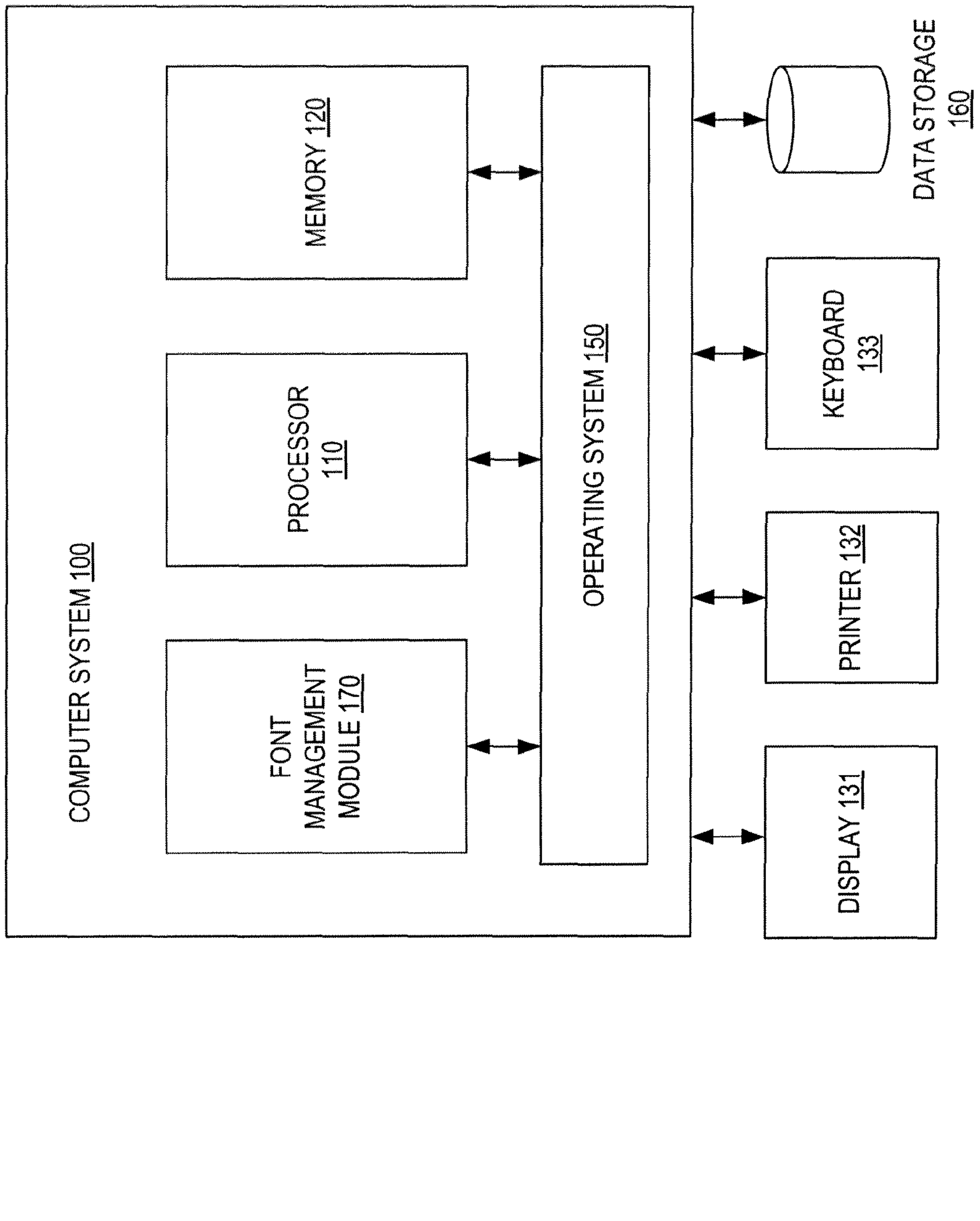
FIG. 1 illustrates a network architecture in which embodiments of the present invention may be implemented.

Described herein is a method and system that provides a plug-in architecture for creation of a dynamic font. The plug-in architecture can be provided by a computer system. The computer system incorporates a new filter function as a plug-in into a filtering layer of a font program. The filtering layer includes pre-defined filter functions to transform a base font into a new font. The computer system applies one or more font rules in the filtering layer to the base font. The font rules are implemented by the new filter function and at least one of the pre-defined filter functions to randomize an appearance of each character in a character string. The character string rendered with the new font has a dynamic and randomized appearance.

According to embodiments of the invention, a font can have one or more textures of various priorities and orderings embedded in it. The priorities and orderings, as well as various transformations, can be applied to the font on-the-fly as type is written out to a data output device (e.g., a display, a printer, etc.).

For font creators, embodiments of the invention can be realized by a font creation application that allows the font creators to determine a base font, select one or more textures to embed in the font, and dictate rules and randomization levels upon which the texture will be transformed. The font creator may preview the font with textures and rules in place to see how the font looks, and tweak those configurations as necessary to achieve the desired effect. Finally, font creators can save their font creation as a new font, manage any applicable licenses for the original base font and included textures, and output the new font in any number of supported formats (TrueType Font (TTF), OpenType Font (OTF), etc.).

In one embodiment, a font creator may be able to set some of the configuration variables, such as: textures (by providing texture bitmaps), randomization level (by specifying how much randomness is used in the application of the textures; e.g., how often is the texture applied within the string—whether it is applied to every character, to every other character, or somewhere in between. For each texture, a font creator may be able to set the following parameters: the order of precedence a texture should be applied (which affects how often the texture is applied), the opacity of the texture (which may be an explicit value or a range of values), the size of the texture (which may be an explicit value or a range of values), the space between subsequent applications of the same textures (which may be an explicit value or a range of values), and the "jitter" of subsequent applications of the same texture, where "jitter" is defined as how much a texture is rotated upon subsequent applications (which may be an explicit value or a range of values).

Additionally, in one embodiment, a font creator may also indicate ranges of particular effects to be applied dynamically and randomly to a font on-the-fly as they are used to type out characters. The particular effects include, but are not limited to: the percentage a character deviates from the base font with respect to the point size, the deviation from the base font's kerning (i.e., the space between letters), the deviation from the base font's leading (i.e., the space between lines of text), a given standard vector-based transform and the deviation from a base application of that transform. An example of a base application of a vector-based transform is a blur filter applied to an entire font at a base value of 5% blur. A font creator may indicate that she would like individual characters to randomly deviate up to 50% of the base value blur. As a result, the individual characters may have blur values anywhere from 2.5% blur to 7.5% blur.

Embodiments of the invention allow an end user to use a font in the following ways. In one scenario, an end user may obtain a font with embedded textures, application rules and randomization scheme built into it. The end user only consumes the font, and may not be able to customize any of the configurations that the font creator set into the font. When the end user consumes a font (e.g., e.g., by typing a string of characters such as: "AAAAAAAAA"), the characters have textures applied to them according to the rules set by the font creator. Thus, each character "A" may look slightly different from every other "A".

In another scenario, an end user may obtain a font with embedded textures, application rules and randomization scheme built into it. The end user may be able to tweak some of the configurations set by the font creator. For example, if the font creator specified that the texture opacity is 50%, the end user may, in her application of the font, override that value (50%) with a different value (e.g., 40%, 100%, or any other desired percentage).

In yet another scenario, an end user may script the production of type using a dynamic font, overriding some of the default values set by the font creator. The end user may use an Application Programming Interface (API) to automate the creation of a scriptable type that looks organic and dynamic. The script that produces the type may be called in an automated manner, e.g., by a Web server for the display of type on a Web page.

Embodiments of the present invention provide a plug-in architecture that allows font creators to create new fonts that have dynamic and randomized appearances. The plug-in architecture can be expanded by font creators with new plug-ins that define new textures and new functions. The plug-in architecture is portable across different platforms. Textures, rules, functions, and configurations are embedded in the font itself, so no additional code is necessary.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates a computer system 100 in which embodiments of the present invention may operate. In one embodiment, the computer system 100 includes one or more processors 110 and a memory 120. The memory 120 may be a volatile memory device (e.g., random access memory (RAM)), non-volatile memory devices (e.g., flash memory), d/or other types of memory devices. The computer system 100 hosts an operating system 150 which manages the resources in the computer system 100. The computer system 100 is coupled to a display 131, a printer 132, a keyboard 133 and data storage 160. In one embodiment, the data storage 160 may comprise mass storage devices, such as magnetic or optical storage based disks, tapes or hard drives.

In one embodiment, the computer system 100 also includes a font management module 170 to provide fonts that have a dynamic and randomized appearance. The font management module 170 provides a filtering layer to a font program to transform a base font into a new font. The filtering layer includes pre-defined font rules and pre-defined filter functions that serve as a base plug-in architecture upon which font creators can add their own designs, including new filter functions and textures to produce new fonts. A font creator may also add new font rules, or at the very least to add lines that reference the filter functions and textures added by them. The new filter functions and textures can be added as plug-ins that cooperate with the pre-defined font rules and pre-defined filter functions. The font rules, filter functions and textures are embedded in the font program. Thus, the entire font program including the filtering layer can be ported to any compatible system and can be used by an end user to generate type in the new font.

Figure 2:
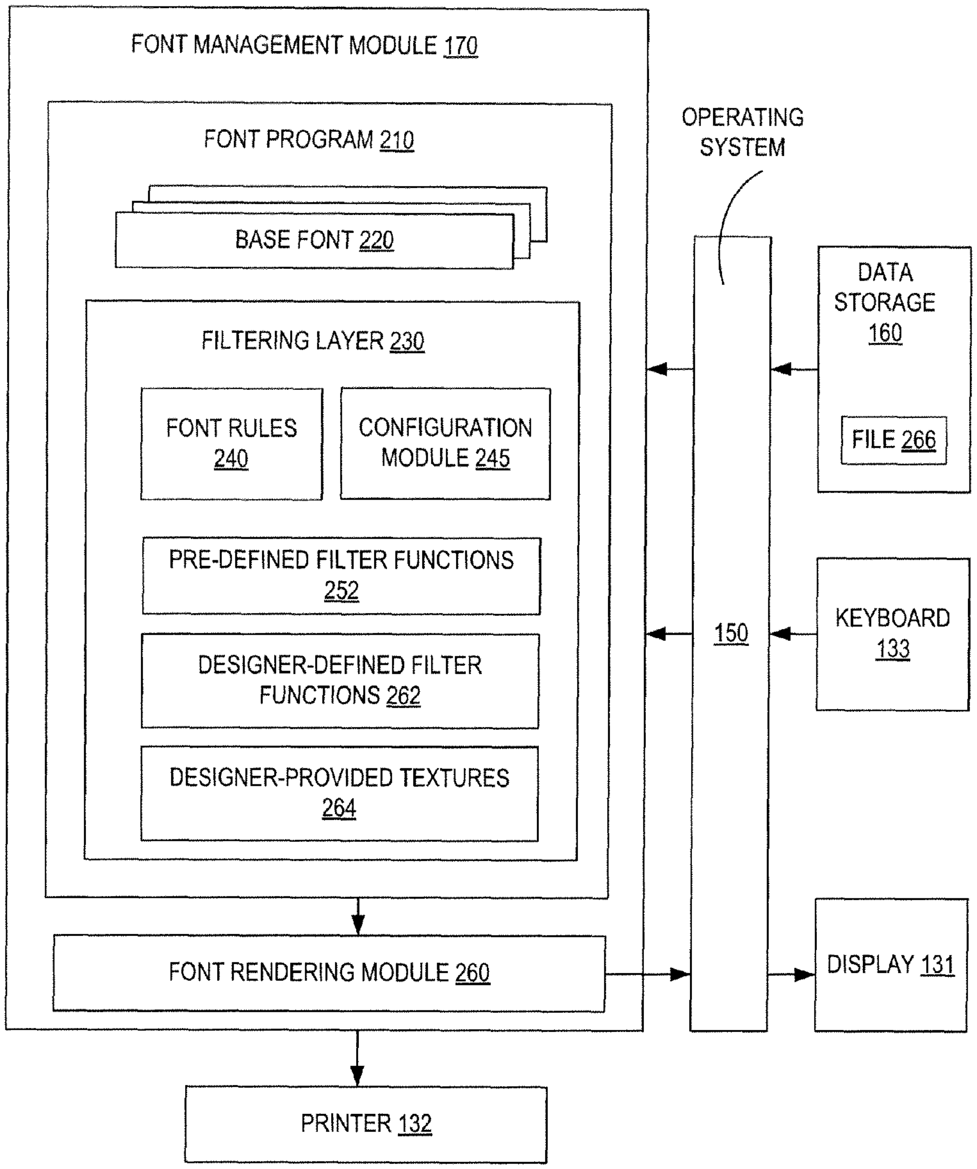
FIG. 2 is a block diagram of one embodiment of a font management module that manages the dynamic rendering of fonts.

FIG. 2 illustrates an embodiment of the font management module 170. In one embodiment, the font management module 170 includes a font program 210 that defines a number of base fonts 220. The font program 210 also includes a filtering layer 230 that applies textures and transformations to the base fonts 220. The filtering layer 230 includes a number of font rules 240, which specify the textures, transformations and randomization parameters to be applied to a base font. The randomization parameter may be stored in a configuration module 245. In one embodiment, each pre-defined font rule may specify a randomization scheme having one or more of the randomization parameters (e.g., scale type randomly between 75%-100%). In one embodiment, an end user may be allowed to adjust the randomization parameters in the configuration module 245, thereby overriding the pre-defined parameters set by a font creator.

In one embodiment, the filtering layer 230 also includes pre-defined filter functions 252, designer-defined filter functions 262 and designer-provided textures 264. According to the font rules 240, the font management module 170 applies one or more of the filter functions 252, 262, and one or more of the textures 264 to abuse font to implement the font rules 240.

In an alternative embodiment, the font program 210 including the filtering layer 230 may be stored in the data storage 160 and retrieved when receiving a type generation request.

In one embodiment, the definition of the new font is read by a font rendering module 260, which contains rendering instructions for rendering the type of one or more alphanumeric characters that are provided by an end user or a script. The alphanumeric characters may be typed into the computer system 100 via the keyboard 133 or retrieved from a file 266 in the data storage 160. The operating system 150 may read and execute the rendering instructions and display the rendered type on the display 131. Alternatively, the rendering instructions may be directly executed by functions provided by the printer 132, which then prints the rendered type on a print medium.

In one embodiment, the filtering layer 230 allows one or more transformations to be applied to a character string in a base font, with a degree of randomness specified by the configuration module 245. The transformations may be applied to one or more textures that are tiled and overlaid on top of the character string, or directly applied to the character string. Each texture in 252 or 264 may be in the for of a bitmap or vector graphic of a given size (e.g., 500 pixels by 500 pixels). The character string may be part of a document, which is stored in memory or being created by a user as the user inputs characters into the computer system 100. When applied to the textures, the transformations may change the appearance of the textures with respect to the opacity, scaling factor, position, orientation, etc. When applied directly to a character string, the transformations may change the appearance of the character string with respect to the positions and/or orientations of the characters. For example, the transformations may apply a shaped envelope to the outer contour of the string to produce a distortion effect.

For example, a font creator may specify in the font rules 240 that the opacity of a given texture is a random value in the range of 20% to 40%. That is, each time the bitmap representing the texture is overlaid on the character string, anew, random strength of the bitmap is chosen in the range of 20% to 40%. In a scenario where the opacity of the texture is 20%, a black pixel in the texture bitmap may remove 20% of the darkness of the corresponding pixel in the character string. As another example, a font creator can specify in the font rules 240 that a texture is to be rotated by a degree in the range of 10% to 20% when the texture bitmap is overlaid on a character string. A font creator may also specify how multiple textures can be applied to a character string; for example, in a round-robin fashion or by a random selection.

FIG. 3 illustrates an example of font rules 310 and 320 applied to a string of identical letters ("A") in a base font. For ease of illustration, the string of A is provided within the definition of the rules. It is understood that, in practice, the letter string would be inputted by a user or a script, via keyboard, stored file, or other input mechanisms.

In the example of FIG. 3, three strings 351, 352 and 353 are shown. The first row 351 is a string of A in the base font without any font rule applied to it. The second row 352 is a string of A having the font rule 310 applied to it. Font rule 310 specifies a randomization scheme, in which some or all of the letters in the string are each scaled by a scale factor (randomly chosen in the range of 75%-100%) and distorted by a distortion factor (randomly chosen in the range of 10%-50%). Font rule 310 further includes rules for determining whether a letter in the string is to be scaled and/or to be distorted. The specific letters being scaled are determined by condition 316 that includes counters m, n and a parameter SKIPFACTOR. The specific letters being distorted are determined by condition 317 that includes counters p, n and the parameter SKIPFACTOR.

The third row 353 is a string of A having the font rule 320 applied to it. Font rule 320 specifies a texture application scheme, in which a texture in the file "sometexture.svg" is applied to each letter in the string sequentially. The texture is applied with strength ("opacity") determined by t, where t is incremented by 10% for each letter.

Figure 4:
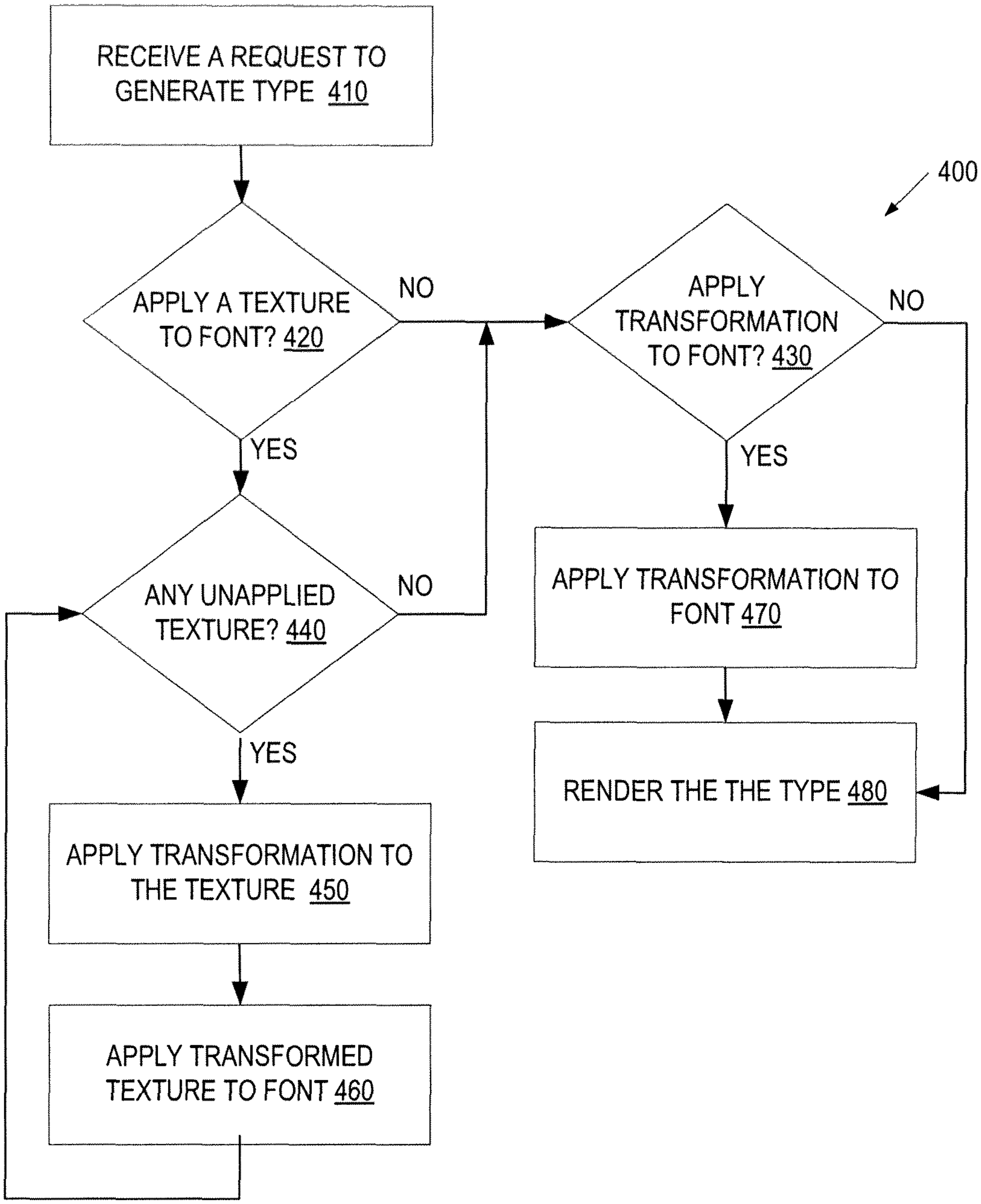
FIG. 4 is a flow diagram illustrating one embodiment of a method for generating and render of a dynamic font.

FIG. 4 is a flow diagram illustrating one embodiment of a method 400 that enables dynamic font rendering. The method 400 may be performed by computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the computer system 100 of FIG. 1.

Referring to FIG. 4, in one embodiment, the method 400 begins when the computer system 100 receives a request to generate a type having a specified font (block 410). The request may be sent by a user or a script. The request may specify the location of an input file, or may provide the input via a user interface (e.g., keyboard, keypad, etc.). The computer system 100 identifies the base font on which the requested font is based, and determines whether the requested font is defined by one or more font rules (e.g., the font rules 240 of FIG. 2). After the base font and the font rules are identified, the computer system 100 determines, for each font rule, whether or not the font rules apply a texture to the base font (block 420). If the font rule applies no texture, the computer system 100 determines whether or not the font rule applies a transformation to the base font (block 430). If a transformation is to be applied to the base font, the computer system 100 proceeds to apply the transformation to the base font (block 470). As described above, the transformation to the base font may include: the percentage a character deviates from the base font with respect to the point size, the deviation from the base font's kerning, leading, or the deviation from a base application of a given standard transform. After the transformation is applied to the base font, or, at block 430, it is determined that there is no transformation to be applied, the computer system 100 proceeds to process the next font rule (if any rule is left).

If, at block 420, the font rule specifies one or more textures, the computer system 100 applies the one or more textures according to the font rule. If there are multiple textures to be applied (block 440), the textures may be applied sequentially, randomly, or in any priorities and orderings specified by the font rule. The multiple textures may be tiled or overlaid according to the specified priorities and orderings. The font rule may specify that one or more transformations are to be applied to each texture, or at least one of the textures, before the texture is applied to the base font. After a texture is applied to the base font (block 450), the computer system 100 determines whether or not the font rule further specifies a transformation to be applied to the texturized font (block 460). If a transformation is to be applied, the computer system 100 proceeds to apply the transformation to the texturized font. After the transformation is applied to the texturized font, or if there is no transformation to be applied to the texturized font, the computer system 100 proceeds to process the next texture until all of the textures specified in the font rule are applied (block 440).

After all of the textures specified in the font rule are applied, the computer system 100 proceeds to block 430 to determine whether or not the font rule applies a transformation to the font, which, in this case, is the texturized font. The computer system 100 applies the transformation, if there is any (block 470). After the transformation is applied to the base font, or, at block 430, it is determined that there is no transformation to be applied, the computer system 100 proceeds to process the next font rule (if any rule is left).

After all of the font rules are applied, the computer system 100 then proceeds to render the type in the requested font (block 480). It is noted that the application of the font rules occurs on-the-fly as the type is rendered. That is, each character in a character string, in a sequential order, is applied with the font rules and then rendered before the next character in the string is processed. Each time the filter functions implementing the font rules are called to generate the type for a character, different randomization parameters, priority or ordering may be used. Therefore, the character string can be rendered with a dynamic and randomized appearance.

Embodiments of the invention provide a system and method that is portable, automatable, customizable and realistic. It is portable because all the textures and/or rules an end user needs to transform a type are embedded in the font file. It is automatable because no human intervention is necessary to generate non-uniform and organic type effects. It is customizable because an end user can tweak the configurations of the fonts on-the-fly (in a live manner) until the randomization results in a visual effect that most appeals to the end user. The resulting creative type effects are more realistic as they are truly random and not statically baked into the font file. Therefore, text with many instances of the same character repeated in succession or within proximity of each other maintain an organic appearance of randomness.

Figure 5:
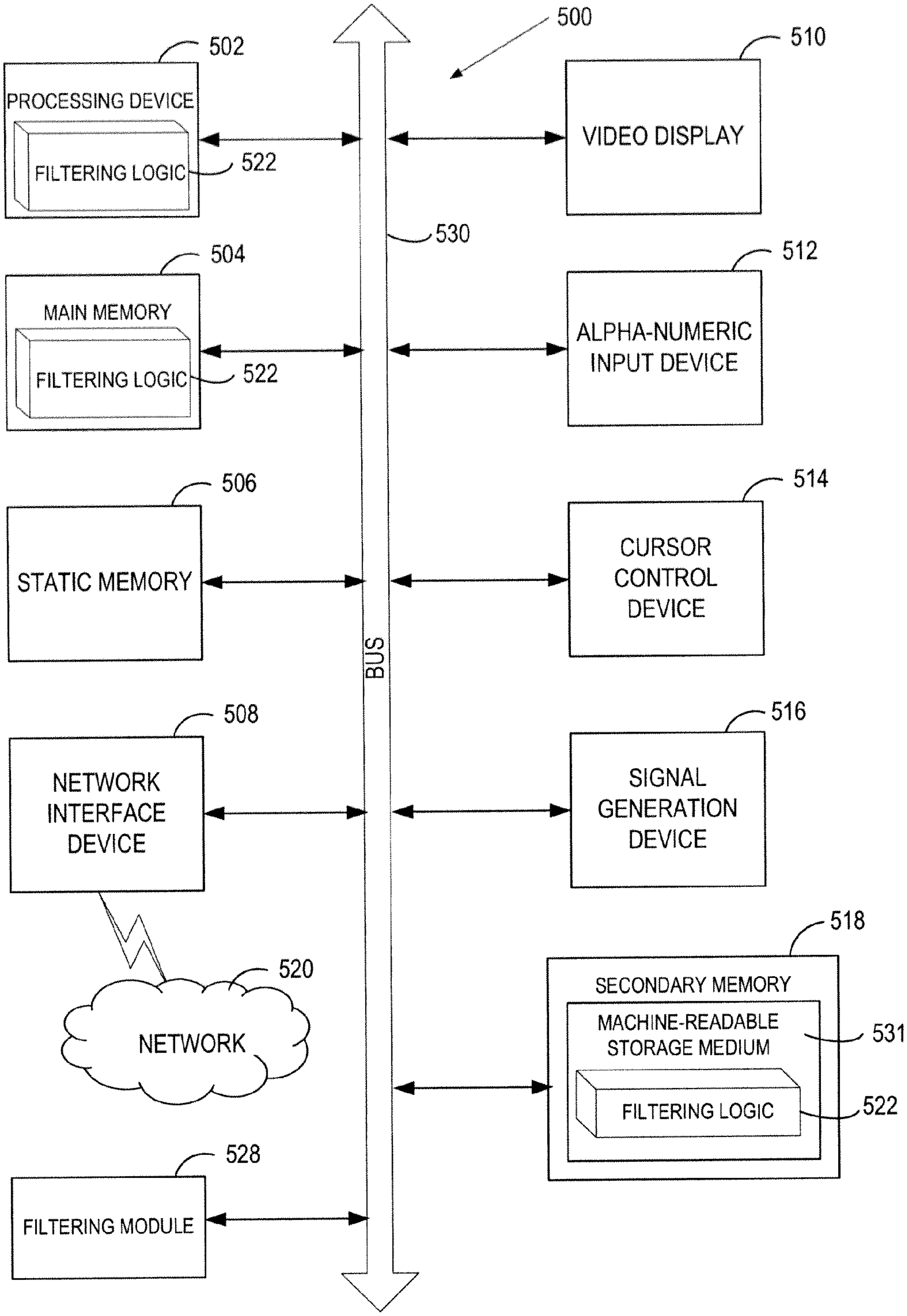
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g. networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute filtering logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., filtering logic 522) embodying any one or more of the methodologies or functions described herein (e.g., the filtering layer 230 of FIG. 2). The filtering logic 522 may also reside, completely, or at least partially, within the main memory 504 and/or within the processing device 502 during execution thereof by the computer system 500; the main memory 504 and the processing device 502 also constituting machine-readable storage media. The filtering logic 522 may further be transmitted or received over a network 520 via the network interface device 508.

The machine-readable storage medium 531 may also be used to store the filtering logic 522 persistently. While the machine-readable storage medium 531 is shown in an exemplary embodiment to be a single medium, the term "machine-readable storage medium" should be taken to include a single media or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage odium" shall accordingly be taken to include, but not be limited to, solid-state memories, and optical and magnetic media.

The computer system 500 may additionally include a filtering module 528 for implementing the functionalities of the filtering layer 230 of FIG. 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be born in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "incorporating", "applying", "rendering", "transforming", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

incorporating, by a processing device, a new filter function into a filtering layer of a font program, the filtering layer comprising a plurality of pre-defined filter functions to transform a base font into a new font and a plurality of textures defined by at least one of texture bitmaps or texture graphic vectors;

applying, by the processing device, one or more font rules in the filtering layer to the base font, the one or more font rules implemented by the new filter function, a pre-defined filter function of the plurality of pre-defined filter functions and a texture of the plurality of textures, wherein a font rule of the one or more font rules specifies a randomization scheme applied to the base font separately for each character of a character string to randomize an appearance of each character in the character string; and rendering, by the processing device, each character of the character string separately using the new font such that the appearance of each character of the character string has a randomized appearance in view of the randomization scheme applied to the base font for each character.

2. The method of claim 1, further comprising:

transforming the texture with a transformation that is defined by a randomized parameter; and applying the texture to the character string with the randomized parameter.

3. The method of claim 2, wherein the transformation of the texture comprises one or more of the following:

opacity adjustment, texture scaling, tiling position adjustment, rotation adjustment, randomization of texture tiling position, and designer-defined transformations.

4. The method of claim 1, further comprising:

randomly choosing a randomized parameter for a transformation referenced by one of the font rules; and applying the transformation to the character string.

5. The method of claim 4, wherein the transformation of the character string comprises one or more of the following:

scaling, distortion, enveloping, position adjustment, blurring, and designer-defined transformations.

6. The method of claim 1, further comprising:

overriding a pre-defined parameter with a parameter provided by an end user, the pre-defined parameter used by a transformation that implements one of the font rules.

7. The method of claim 1, further comprising:

embedding textures having different priorities and orderings into the new font.

8. A system comprising:

data storage to store a font program that comprises a filtering module, the filtering module comprising a plurality of pre-defined filter functions to transform a base font into a new font and a plurality of textures defined by at least one of texture bitmaps or texture graphic vectors; and a processing device coupled to the data storage, the processing device comprising:

a font management module to incorporate a new filter function into the filtering module, and apply one or more font rules in the font program to the base font, the one or more font rules implemented by the new filter function, a pre-defined filter function of the plurality of pre-defined filter functions and a texture of the plurality of textures, wherein a font rule of the one or more font rules specifies a randomization scheme applied to the base font separately for each character of a character string to randomize an appearance of each character in the character string; and a rendering module to render each character of the character string separately with the new font such that the appearance of each character of the character string has a randomized appearance in view of the randomization scheme applied to the base font for each character.

9. The system of claim 8, wherein the font management module transforms the texture with a transformation that is defined by a randomized parameter, and applies the texture to the character string.

10. The system of claim 9, wherein the transformation of the texture comprises one or more of the following:

opacity adjustment, texture scaling, tiling position adjustment, rotation adjustment, randomization of texture tiling position, and designer-defined transformations.

11. The system of claim 8, wherein the font management module implements a transformation, according to one of the font rules, by randomly choosing a randomized parameter, and applying the transformation to the character string.

12. The system of claim 8, wherein the transformation of the character string comprises one or more of the following:

scaling, distortion, enveloping, position adjustment, blurring, and designer-defined transformations.

13. The system of claim 8, wherein the processing device further comprises:

a configuration module to store a pre-defined randomization parameter used by a transformation that implements one of the font rules, wherein the pre-defined randomization parameter can be overridden by a parameter provided by an end user.

14. A non-transitory computer readable storage medium comprising instructions that, when executed by a processing device, cause the processing device to:

incorporate, by the processing device, a new filter function into a filtering layer of a font program, the filtering layer comprising a plurality of pre-defined filter functions to transform a base font into a new font and a plurality of textures defined by at least one of texture bitmaps or texture graphic vectors;

apply, by the processing device, one or more font rules in the filtering layer to the base font, the one or more font rules implemented by the new filter function, a pre-defined filter function of the plurality of pre-defined filter functions and a texture of the plurality of textures, wherein a font rule of the one or more font rules specifies a randomization scheme applied to the base font separately for each character of a character string to randomize an appearance of each character in a character string; and render each character of the character string separately using the new font such that the appearance of each character of the character string has a randomized appearance in view of the randomization scheme applied to the base font for each character.

15. The non-transitory computer readable storage medium of claim 14, wherein the processing device is further to:

transform the texture with a transformation that is defined by a randomized parameter; and apply the texture to the character string with the randomized parameter.

16. The non-transitory computer readable storage medium of claim 15, wherein the transformation of the texture comprises one or more of the following:

opacity adjustment, texture scaling, tiling position adjustment, rotation adjustment, randomization of texture tiling position, and designer-defined transformations.

17. The non-transitory computer readable storage medium of claim 14, wherein the processing device is further to:

randomly choose a randomized parameter for a transformation referenced by one of the font rules; and apply the transformation to the character string.

18. The non-transitory computer readable storage medium of claim 17, wherein the transformation of the character string comprises one or more of the following:

scaling, distortion, enveloping, position adjustment, blurring, and designer-defined transformations.

19. The non-transitory computer readable storage medium of claim 14, wherein the processing device is further to:

override a pre-defined parameter with a parameter provided by an end user, the pre-defined parameter used by a transformation that implements one of the font rules.

20. The non-transitory computer readable storage medium of claim 14, wherein the processing device is further to:

embed textures having different priorities and orderings into the new font.

* * * * *